US006199362B1

(12) United States Patent
Hepner

(10) Patent No.: US 6,199,362 B1
(45) Date of Patent: Mar. 13, 2001

(54) METHOD OF CONTROLLING AND REGULATING A POWER PLANT, AND POWER PLANT FOR IMPLEMENTING THE METHOD

(75) Inventor: Stephan Hepner, Althäusern (CH)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/337,553

(22) Filed: Jun. 22, 1999

(30) Foreign Application Priority Data

Sep. 26, 1998 (EP) ................................................ 98810593

(51) Int. Cl.[7] ........................................................ F02C 6/00
(52) U.S. Cl. ........................................................ 60/39.03
(58) Field of Search ............................... 60/39.03, 39.12, 60/39.02, 39.281

(56) References Cited

U.S. PATENT DOCUMENTS 4,231,761 * 11/1980 Meyer-Kahrweg .................... 48/192
4,665,688 * 5/1987 Schiffers et al. .................... 60/39.07

FOREIGN PATENT DOCUMENTS 36 18 745 12/1986 (DE) .
37 31 627 3/1989 (DE) .
0 379 108 7/1990 (EP) .
WO 98 27004 6/1998 (WO) .

OTHER PUBLICATIONS

European Search Report dated Dec. 3, 1998.

* cited by examiner

*Primary Examiner*—Timothy S. Thorpe
*Assistant Examiner*—William Rodriguez
(74) *Attorney, Agent, or Firm*—Burns, Doane, Swecker & Mathis, L.L.P

(57) ABSTRACT

In a method of controlling and regulating a power plant (50), in which power plant (50) thermal power is generated in a combustion chamber (35) from a gaseous fuel and the thermal power is at least partially converted into electrical power in conversion equipment (36), and in which power plant (50) the fuel for the combustion chamber (35) is produced in a fuel producer (31) from a feed product with the application of thermal and/or electrical power, which is removed at the outlet of the conversion equipment (36), and said fuel is passed on to the combustion chamber (35), optimal stability with a simultaneously wide control dynamic range are achieved in that the production of the fuel in the fuel producer (31) is stabilized by a first control loop (31, 51, 53, 60), and the conversion of the fuel into electrical power in the conversion equipment (36) is stabilized by a second control loop (36, 33, 55, 56, 58), and in that the power plant (50) as a whole is kept within a predefined operating range (a, b) by coupling the two control loops.

14 Claims, 5 Drawing Sheets

37
38
391
392
36
CONVERSION EQUIPMENT
35
COMBUSTION CHAMBER
FUEL DISTRIBUTION SYSTEM 34
$P_{f2}$
$\dot{m}_{PG}$
33
$P_{f1}$
32
$\dot{m}_{FG}$
$P_{f3}$
31
FUEL PRODUCER
393
30

FUEL DISTRIBUTION SYSTEM
34
CONTROL VALVE
33
REDUCING DEVICE
32
391
392
37
38
36
35
F3
CONVERSION EQUIPMENT
COMBUSTION CHAMBER
POWER CONTROLLER
ADAPTATION CIRCUIT
VALVE ACTUATOR
FUEL PRODUCT
SUPPLY
PRESS. REG.
PRESS. REG.
FUEL/FEED PRODUCT CONVERTER
$P_c$
$P_m$
$\Delta P_c$
$P_{f1}$
$P_{f2}$
$P_{f3}$
$h_c$
$\dot{m}_{fc}$
F1
F2
C
50
51
52
53
54
55
56
57
58
59
60
31

METHOD OF CONTROLLING AND REGULATING A POWER PLANT, AND POWER PLANT FOR IMPLEMENTING THE METHOD

BACKGROUND OF THE INVENTION

1. Field of the Invention

The present invention relates to the field of power plant engineering. It pertains to a method of controlling and regulating a power plant, in which power plant thermal power is generated in a combustion chamber from a gaseous fuel and the thermal power is at least partially converted into electrical power in conversion equipment, and in which power plant the fuel for the combustion chamber is produced in a fuel producer from a feed product with the application of thermal and/or electrical power, which is removed at the outlet from the conversion equipment, and said fuel is passed on to the combustion chamber.

The present invention also relates to a power plant for implementing the method.

2. Discussion of Background

In view of the fact that environmental protection legislation is becoming increasingly more strict, it is becoming increasingly more difficult to dispose of waste products from refinery processes. For this reason, processes which convert such waste products into fuels which can subsequently be used in a power plant to generate electrical and/or thermal power are becoming profitable.

A typical plant for the conversion of waste materials into electrical energy comprises a gasification plant which converts the tar accumulating as refinery waste into so-called "Syngas", a combustible mixture of various gases. The Syngas is then burned in a gas turbine, which at least partially converts the thermal energy of the hot gases produced into electrical energy (Integrated Fuel and Power Generation IFPG). In this case, the gas turbine is usually part of a combined process (with a gas and steam turbine), in order to increase the overall efficiency of the conversion of Syngas into electrical power. Some of the power generated is fed back (in the form of steam and/or electrical power) into the gasification plant, in order to effect the production of the Syngas. There is, therefore, close coupling between the Syngas producer (gasification plant) and the Syngas consumer (gas turbine or power plant block). In particular, stable, steady-state operation of these closely interwoven parts of the plant can be achieved only if the production and consumption of the Syngas are in harmony with each other. To this end, it is necessary for a control and regulation method to be developed which takes account of the special features of an IFPG plant and differs considerably from the operation of an autonomous power plant (Standalone Power Plant SAPP), in which the fuel is obtained from a store in the form of a gas or oil tank.

The typical construction of a power plant 10 in the form of a conventional SAPP plant is reproduced in schematic form in FIG. 1. A fuel supply device 12 (e.g. a pump) removes the fuel from a fuel store 11 and compresses or decompresses (expands) said fuel to a specific predefined pressure $p_{f1}$. The fuel supply to the combustion chamber 16 is controlled by a control valve 14. A fuel distribution system 15 distributes the fuel mass flow fed in to one or more burners arranged inside the combustion chamber 16. The thermal power from the combustion chamber 16 is then converted, in subsequent conversion equipment 17 (gas turbine, waste-heat recovery boiler, steam turbine) into electrical power and/or steam, for example in a combined cycle. The basic strategy for controlling and regulating such a plant has two objectives: (a) the production of any desired, time-variable output power profiles within the limits of the operating range of the plant, and (b) ensuring the necessary fuel supply without significant delays.

Objective (a) is typically achieved by a power control loop, which brings the tracking error $$dP(t)=P_c(t)-P_m(t)$$

to zero during steady-state operation. $P_c(t)$ designates the possibly time-variable set point for the power, and $P_m(t)$ is, according to FIG. 1, the measured output power. An overview of the SAPP plant with the principal control loops is illustrated in FIG. 1.

A significant component of the control system is the power controller 20. The power controller 20 may contain further control loops internally (for example temperature controllers, pressure regulators etc.), which are necessary to keep the internal states of the power plant within the prescribed operating limits. The power controller may optionally regulate the thermal power (steam) output by the conversion equipment 17 at the outlet 18, or the electrical power output at the output 19. On the input side, the power controller 20 has applied to it the difference between $P_c$ and $P_m$, which is formed in a subtracter 21. On the output side, said power controller 20 outputs a signal which corresponds to the required fuel mass flow $\dot{m}_{fc}$. The output signal from the power controller 20 is converted, in a subsequent fuel/valve position converter 22, into a valve position signal $h_c$ for the control valve 14 (or a corresponding variable of another fuel control member, such as the desired speed of a variable-speed fuel pump). The fuel mass flow through the control valve 14 depends on the pressures $p_{f1}$ and $p_{f2}$ upstream and downstream of the valve, the measured values of these pressures also being input into the fuel/valve position converter 22 for the purpose of calculating $h_c$. For an inlet pressure $p_{f1}$ within the limiting curves a and b illustrated in FIG. 2, and within the operating limits of the control valve 14, it is thus possible for any desired fuel mass flow to be set, virtually without delay, by suitable selection of the valve position signal $h_c$. The significant limitation in the dynamics of the mass flow is imposed by the dynamics of the control valve 14. The valve must therefore be designed such that it satisfies all the requirements for achieving the abovementioned objective (a). In order to achieve the abovementioned objective (b) (a precondition for the objective (a)), the fuel supply device 12 must ensure that the input pressure pfl is kept within the limiting curves a and b illustrated in FIG. 2. To this end, according to FIG. 1 a pressure control loop for $p_{f1}$ is provided, and is composed of the fuel supply device 12 and a pressure regulator 13. It should be noted at this point that the fuel supply device 12 is typically a fuel delivery pump, a gas compressor or a pressure reducing valve.

By comparison with the structure of an SAPP plant shown in FIG. 1, an IFPG plant, in which the fuel is produced exclusively within the plant itself, and on which the method of the present invention is based, has the basic structure reproduced in FIG. 3. Such a power plant 30 is characterized by a fuel producer 31, a reducing device 32 (in some cases this may also be a controllable compression device) and a power plant block as has already been described in connection with FIG. 1 and which comprises a control valve 33, a fuel distribution system 34, a combustion chamber 35 and conversion equipment 36 having an outlet 37 for thermal power (steam) and an outlet 38 for electrical power. The reducing device 32 may be a controllable pressure-reducing valve or any other controllable pressure-reducing device. From the outlets 37 and 38 of the conversion equipment 36 (for example gas turbine, waste-heat recovery boiler and steam turbine), a steam feedback line 391 and a power feedback line 392 for electrical power provide the fuel producer 31 with the energy necessary for fuel production. Via the supply 393, an appropriate feed product (for example tar) is fed into the fuel producer 31, to be converted into fuel.

The control and regulation of the IFPG plant according to FIG. 3 differs in principle from the control and regulation of the SAPP plant from FIG. 1, since, in the IFPG plant, the fuel producer 31 must be controlled in such a way that, within the operating limits of the power plant, it is adapted to the fuel consumption of the conversion equipment 36. The setting of the objective for the control may in this case be described such that for the power there is a control loop in which the production and the consumption of fuel are adapted to each other within predefined limits. The limits may be expressed in the form of operating pressures.

Those operating limits for the plant which are significant and important for the control are the limiting pressures for the pressure Pfl at the inlet to the control valve 33 and for the pressure $p_{f3}$ at the outlet of the fuel producer 31. The limiting curves a and b reproduced in FIG. 2 likewise apply to both pressures, said curves representing intrinsic properties of the fuel producer 31 and of the conversion equipment 36, and it being possible for said curves to depend on various plant parameters, such as the electrical output power generated. The operation of the plant 30 is only permissible when $p_{f1}$ and $p_{f3}$ are within the corresponding limits. If these limits are exceeded, emergency measures must be taken for the fuel producer 31 and/or the conversion equipment 36. There are further boundary conditions for the operation of the fuel producer 31 and conversion equipment 36, these conditions being taken into account by internal controllers, although it is not necessary to discuss these further in the present connection.

The control and regulation system which is suitable for a plant according to FIG. 3 must satisfy the following objectives:

(1) It must stabilize the pressure $p_{f3}$ at the outlet of the fuel producer 31 within predefined limits (operating condition for the fuel producer).

(2) It must stabilize the inlet pressure $p_{f1}$ for the fuel distribution system 34 within predefined limits (operating condition for the fuel distribution system).

(3) It must bring the fuel production and the fuel consumption into harmony with each other, in order to obtain steady-state operating points within the permissible operating range for any desired and demanded output power from the conversion equipment 36.

(4) It must manage the transients of the entire system, including start-up and shutdown.

The fundamental difficulty which is common to the abovementioned objectives is that of maintaining the equilibrium between the fuel mass flows of the fuel consumption $\dot{m}_{PG}$ and the fuel production $\dot{m}_{FG}$, namely $$\dot{m}_{PG}=\dot{m}_{FG}.$$

Each deviation from this equilibrium results in a transient in the system and leads to an infringement of the operating conditions if appropriate countermeasures are not taken. In the event of a deviation from equilibrium, two cases may be distinguished:

(1) for $\dot{m}_{PG}>\dot{m}_{FG}$ (fuel consumption higher than fuel production), the pressure values for $p_{f1}$ and $p_{f3}$ will decrease if there is no corrective intervention and the fuel production rate is constant (since the supply of fuel available in the fuel producer and fuel distribution system decreases), until said pressure values depart in a downward transgression from the operating range defined by the limiting curves b in FIG. 2.

(2) for $\dot{m}_{PG}<\dot{m}_{FG}$ (fuel consumption lower than fuel production), the pressure values for $p_{f1}$ and $p_{f3}$ will rise if there is no corrective intervention and the fuel production rate is constant (since fuel accumulates in the storage volume of the fuel producer and of the fuel distribution system), until said pressure values exceed the limiting curve a in FIG. 2.

The type of control and regulation system used previously in an IFPG plant according to FIG. 3 is reproduced in the simplified schematic diagram in FIG. 4. The significant feature of the control loop for such a power plant 40 is a power controller 42, whose output acts on the supply 393 of the feed product for the fuel producer 31. In this regard, the control system differs from the control system of the SAPP plant from FIG. 1, where the output power from the power plant is controlled via the control valve 14. In order to stabilize the plant within the operating limits, pressure regulators 43 and 44 for the pressures $p_{f1}$ and $p_{f3}$ are also needed.

However, this known control system has various disadvantages:

(1) There is only a weak dynamic correlation between the output power and the supply of the feed product to the fuel producer. In particular, during the production of fuel the quality (the calorific value) of the fuel produced may be subjected to severe fluctuations. Over and above this, there are a large number of further parameters which influence the quality of the fuel. The supply of the feed product therefore represents a very imprecise measure of the power produced.

(2) The dynamics of fuel production (of the fuel producer 31) are generally very slow in comparison with the power dynamics of the power plant block and the conversion equipment 36. The power controller 42 must therefore be adapted to the dynamics of the fuel producer 31, which leads to a narrow bandwidth for the stabilization of the output power. However, this is inadequate for applications such as frequency response, island operation or emergency deloading of the power plant along predefined power gradients.

(3) Combined power plants usually have standard block control systems which are built up on the basic loop from FIG. 1. The power variables involved (measured power $P_m$, desired power $P_c$) are used to distribute the power generation to different power generation units (for example a number of gas turbines or steam turbines) within the power plant, each of the units being controlled by its own power controller. The lack of a power control loop for the power plant in the solution according to FIG. 4 consequently requires the concept of the standard block control system to be rearranged. This becomes clear from the fact that the control valve 33, which (as control valve 14) is used as an actuator for the output power of the power plant in the solution according to FIG. 1, is now assigned to a pressure control loop in the solution according to FIG. 4.

(4) Nor does the control structure according to FIG. 4 take any account of the significant relationships between input variables and output variables which are necessary for the stabilization of the individual parts of the plant: the pressure $p_{f3}$ is an important parameter for the dynamics of the fuel producer 31. Conversely, the supply of the feed product to the fuel producer 31 is the principal actuator for the stabilization of $p_{f3}$. On the other hand, the output power is the principal parameter for the stabilization of the power plant, the fuel supply to the power plant block being the principal controlled variable. It is obvious that the controller structure shown in FIG. 4 does not take these relationships into account, which may lead to problems in the form of dynamic instabilities.

SUMMARY OF THE INVENTION

Accordingly, one object of the invention is to provide a novel method for regulating and controlling IFPG power plants which avoids the disadvantages of the known methods and, in particular, takes account of the special features of this type of power plant and ensures high stability during operation with, at the same time, a wide control dynamic range.

In the case of a method of the type mentioned at the beginning, the object is achieved in that the production of the fuel in the fuel producer is stabilized by a first control loop, and the conversion of the fuel into electrical power in the conversion equipment is stabilized by a second control loop, and in that the power plant as a whole is kept within a predefined operating range by coupling the two control loops. The essence of the invention is to provide separate stabilizing control systems in each case for those parts of the plant concerned with fuel production and power generation, said control systems being based on the relationships of the definitive input and output variables of the respective part of the plant, and interlinking the two control systems in such a way that the overall system is kept within the predefined operating range, the dynamic response of the fuel production being maximized with respect to the power requirements of the power plant block.

A first preferred embodiment of the method according to the invention is characterized in that in the first control loop the pressure ($p_{f3}$) at the outlet from the fuel producer is measured and is kept within a predefined operating range by a first pressure regulator, which controls the supply of the feed product to the fuel producer, in that in the second control loop the power ($P_m$) at the outlet of the conversion equipment is measured and is kept at a predefined power set point by a power controller, which controls the supply of the fuel to the conversion equipment, in that in order to control the fuel supply to the conversion equipment, a control valve is used, in that the power controller outputs a signal which corresponds to the required fuel mass flow, and in that the output signal from the power controller is converted by means of a fuel/valve position converter into a valve position signal and used to operate the control valve.

The coupling between the individual control loops is preferably carried out in that, on the one hand, to adapt sudden load changes to the pressure provided by the fuel producer, a set point change is derived from a pressure measured downstream of the outlet of the fuel producer and is combined with the externally predefined power set point to form a new power set point for the second control loop, and in that, on the other hand, the power controller output signal corresponding to the required fuel mass flow is simultaneously used to control the supply of the feed product to the fuel producer. In order to derive the set point change, use is preferably made either of the pressure measured at the outlet of the fuel producer or of the pressure measured downstream of the control valve.

A development of this embodiment is characterized in that the pressure that is present at the outlet from the fuel producer is reduced to a lower pressure by a reducing device arranged between the fuel producer and the control valve, in that the reduced pressure at the outlet from the reducing device is measured and is kept within a predefined operating range by a second pressure regulator, which acts on the reducing device, in that the measured reduced pressure is simultaneously used to derive the valve position signal, and in that the pressure at the outlet of the control valve is measured and simultaneously used to derive the valve position signal.

The power plant, according to the invention, for implementing the method comprises a combustion chamber, whose inlet is connected via a control valve to a fuel producer having a controllable supply for a feed product used for fuel production, and whose outlet is connected to conversion equipment for the at least partial conversion of the thermal power into electrical power. It is characterized in that the fuel producer, together with a first pressure regulator, whose input is connected to the outlet of the fuel producer and whose output is connected to the supply for the feed product, forms a first control loop, in that the conversion equipment, together with a power controller, whose input is connected via a subtracter for a power set point to the outlet of the conversion equipment and whose output is connected to the control valve, forms a second control loop, and in that there are means which couple the two control loops to each other.

The coupling means preferably comprise an adaptation circuit, whose input is connected to the output of the fuel producer or to the outlet of the control valve, and whose output is connected to an adder for the power set point, and which allocates a set point change for the externally predefined power set point to each pressure value from the outlet of the fuel producer and the control valve, respectively. Furthermore, the coupling means comprise a fuel/feed product converter, whose input is connected to the output of the power controller and whose output is connected via an adder to the supply for the feed product.

Further embodiments emerge from the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 5:
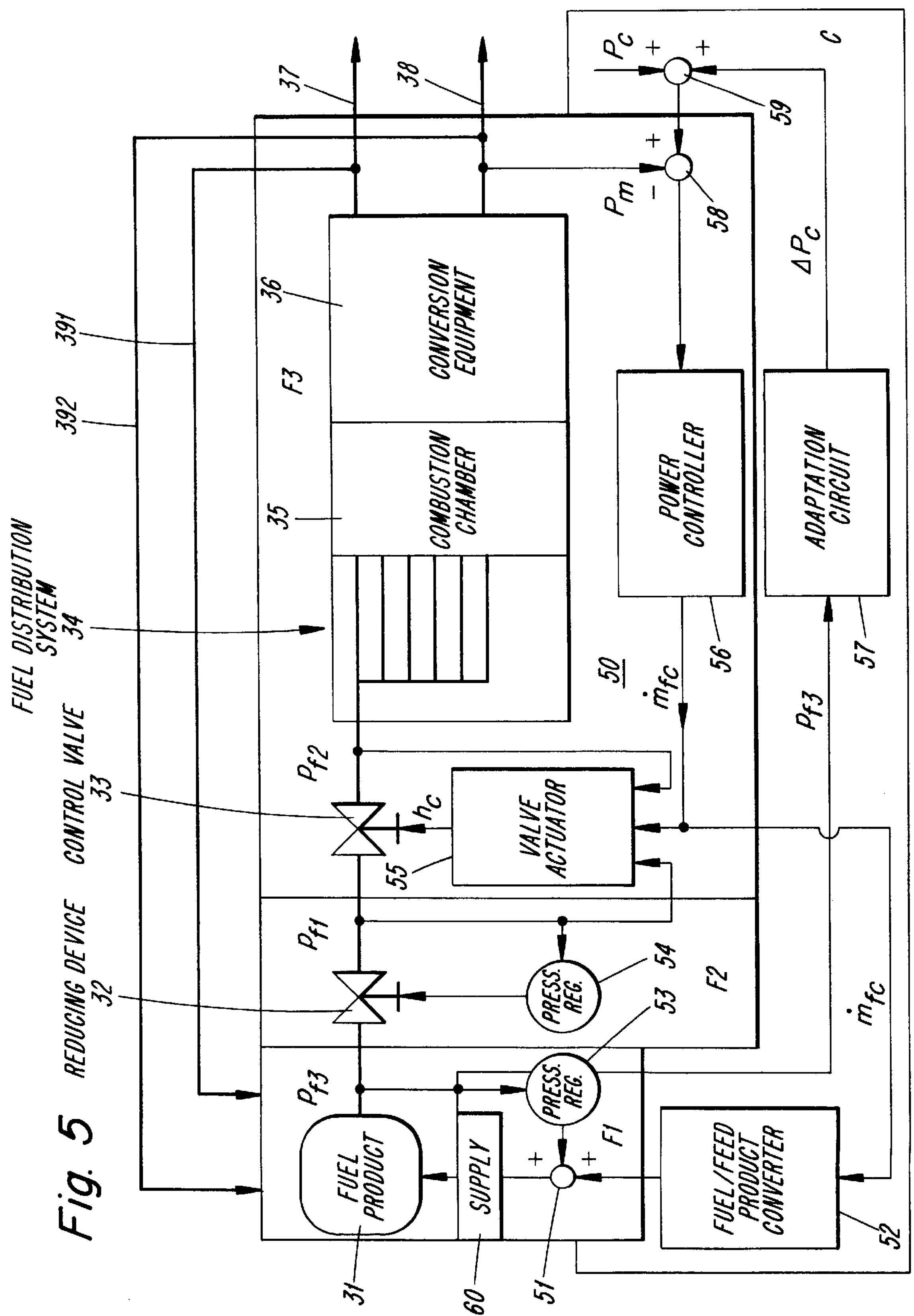
FIG. 5 shows the IFPG plant according to FIG. 3 with control and regulation according to a preferred exemplary embodiment of the invention.

Referring now to the drawings, wherein like reference numerals designate identical or corresponding parts throughout the several views, FIG. 5 shows, in a schematic block illustration, a preferred exemplary embodiment of an IFPG power plant with integrated fuel production and control and regulation according to the invention. The power plant 50 comprises, as the parts of the plant—as explained further above in connection with the prior art—the fuel producer 31, whose outlet is connected to a combustion chamber 35 via a reducing device 32 (may also be a compressor in individual cases), a control valve 33 and a fuel distribution system 34. The hot gases produced in the combustion chamber 35 by one or more burners are converted into electrical and/or thermal energy (steam) in the subsequent conversion equipment 36, use being made of gas turbines and/or steam turbines. The fuel distribution system 34, combustion chamber 35 and conversion equipment 36 form the actual power plant block of the power plant 50. Thermal power can be removed at the outlet of the conversion equipment 36, at a first outlet 37, and electrical power can be removed at a second outlet 38. Some of this power is fed back to the fuel producer 31 via a steam feedback line 391 or a power feedback line 392 for electrical power, and is used there for fuel production. A feed product ("feedstock"), for example tar from a refinery, is fed to the fuel producer 31 via the supply 60 and, with the use of energy, is converted into a combustible mixed gas.

According to FIG. 5, the individual parts of the plant are equipped with separate control loops F1, F2 and F3. The control loop F1, with a pressure regulator 53, stabilizes the pressure $p_{f3}$ of the fuel at the outlet of the fuel producer 31. In this case, the manipulated variable is the supply of the feed product (supply 60). The controlled variable is the pressure $p_{f3}$. The control loop F2, with the pressure regulator 54, stabilizes the pressure Pfl at the inlet of the control valve 33. The manipulated variable is the valve position or mass-flow setting of the reducing device 32, the controlled variable is the pressure $p_{f1}$. The control loop F3, with the power controller 56, is used to stabilize the output power. The manipulated variable is the fuel mass flow into the fuel distribution system 34, or the valve position of the control valve 33, the controlled variable is the measured (thermal and/or electrical) output power $P_m$. The coupling C between the control loops comprises (a) the input of the set point for the fuel mass flow $\dot{m}_{fc}$, via a fuel/feed product converter 52 and an adder 51, into the supply 60 for the feed product, the values from the pressure regulator 53 and from the fuel/feed product converter 52 being added in the adder 51, and (b) coupling the pressure value $p_{f3}$ back to the power controller 56 via an adaptation circuit 57 and an adder 59 as a set point change $\Delta P_c$, which is added in the adder to the set point $P_c$ of the output power, and thus adapts the load transients of the power plant block to the respective production capacity of the fuel producer 31.

Figure 1:
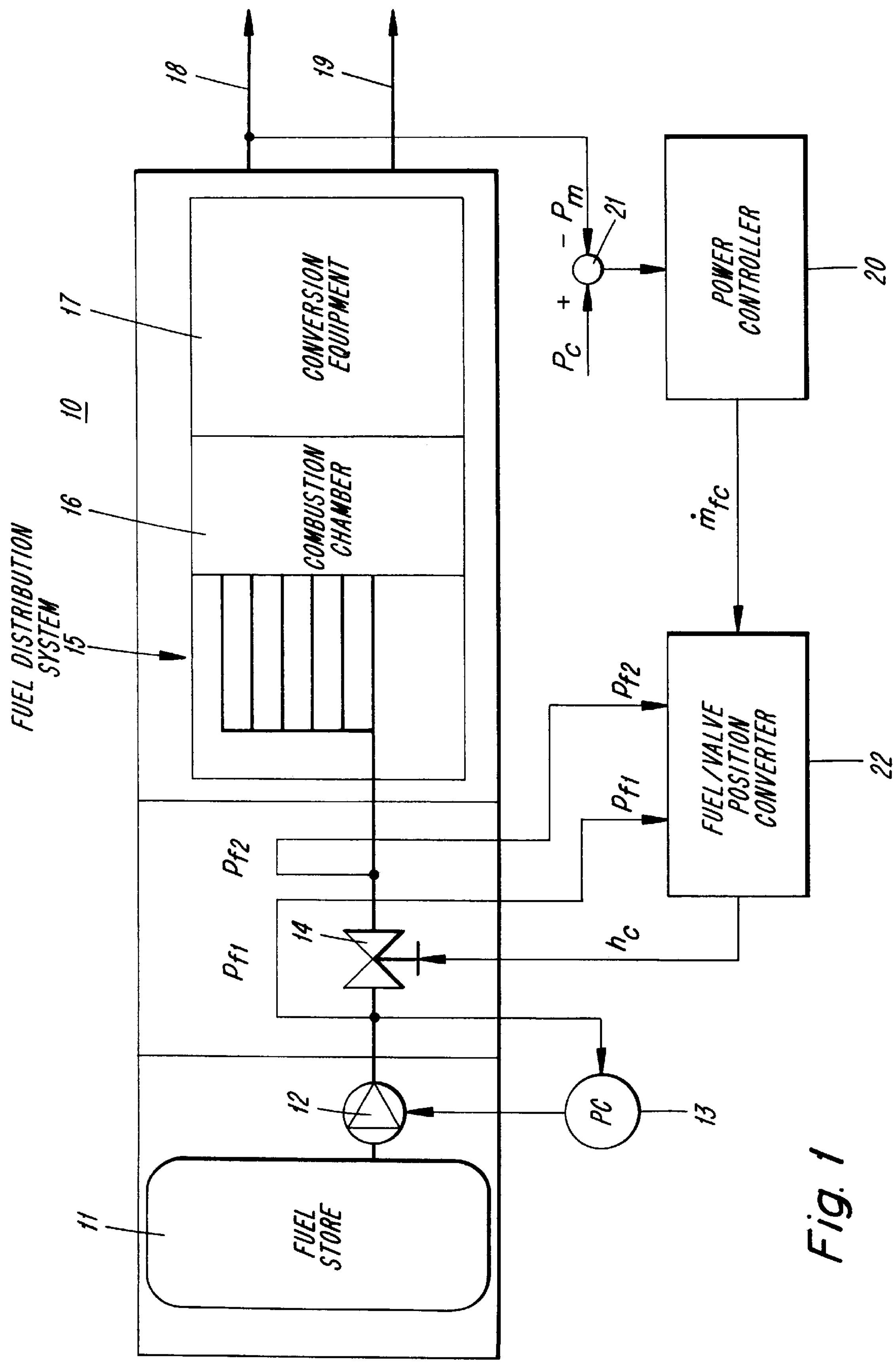
FIG. 1 shows, in a schematic block illustration, an SAPP power plant with the associated control and regulation according to the prior art.
Figure 2:
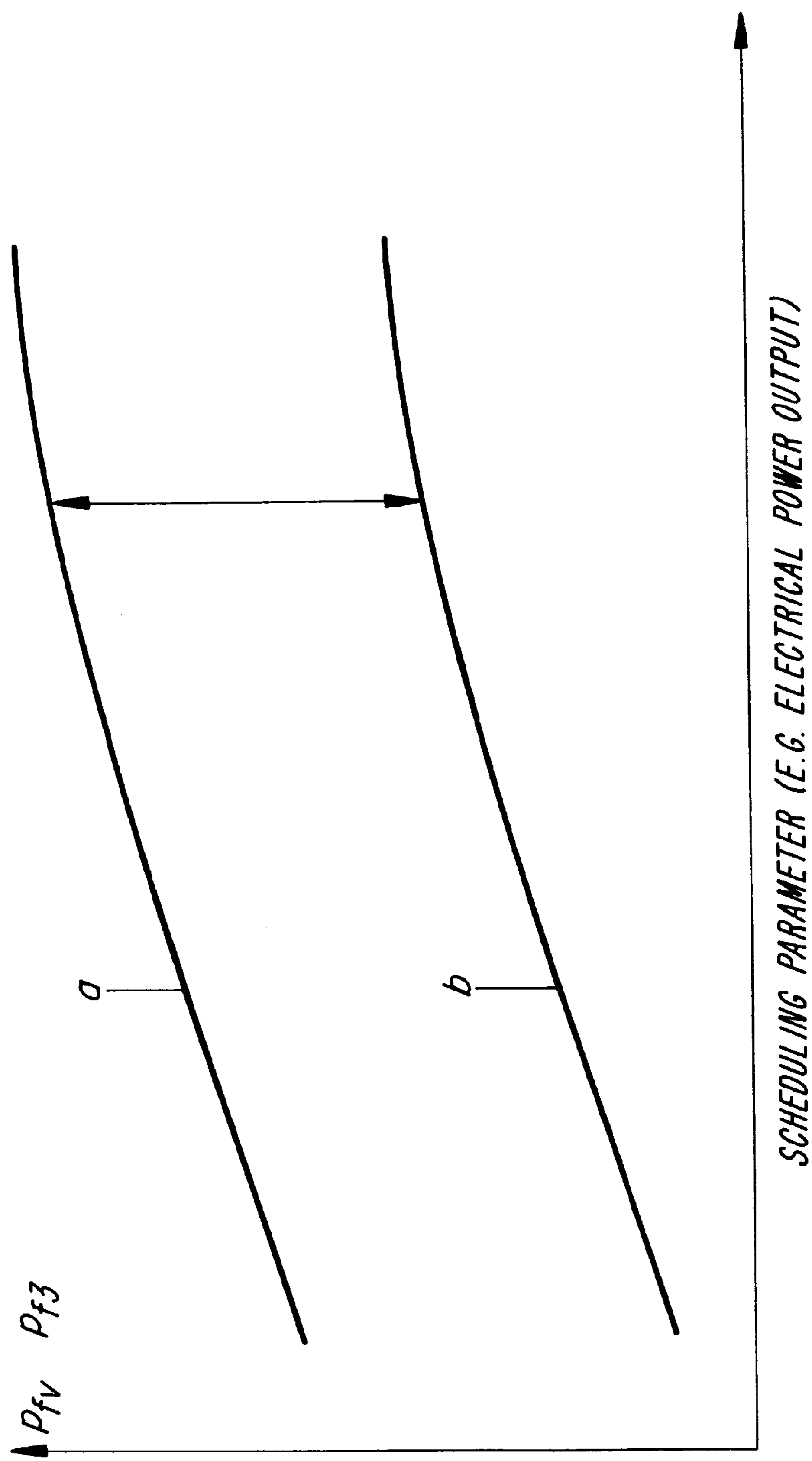
FIG. 2 shows the upper and lower limiting curves, bounding the operating range, for the fuel pressure in a plant according to FIG. 1.
Figure 3:
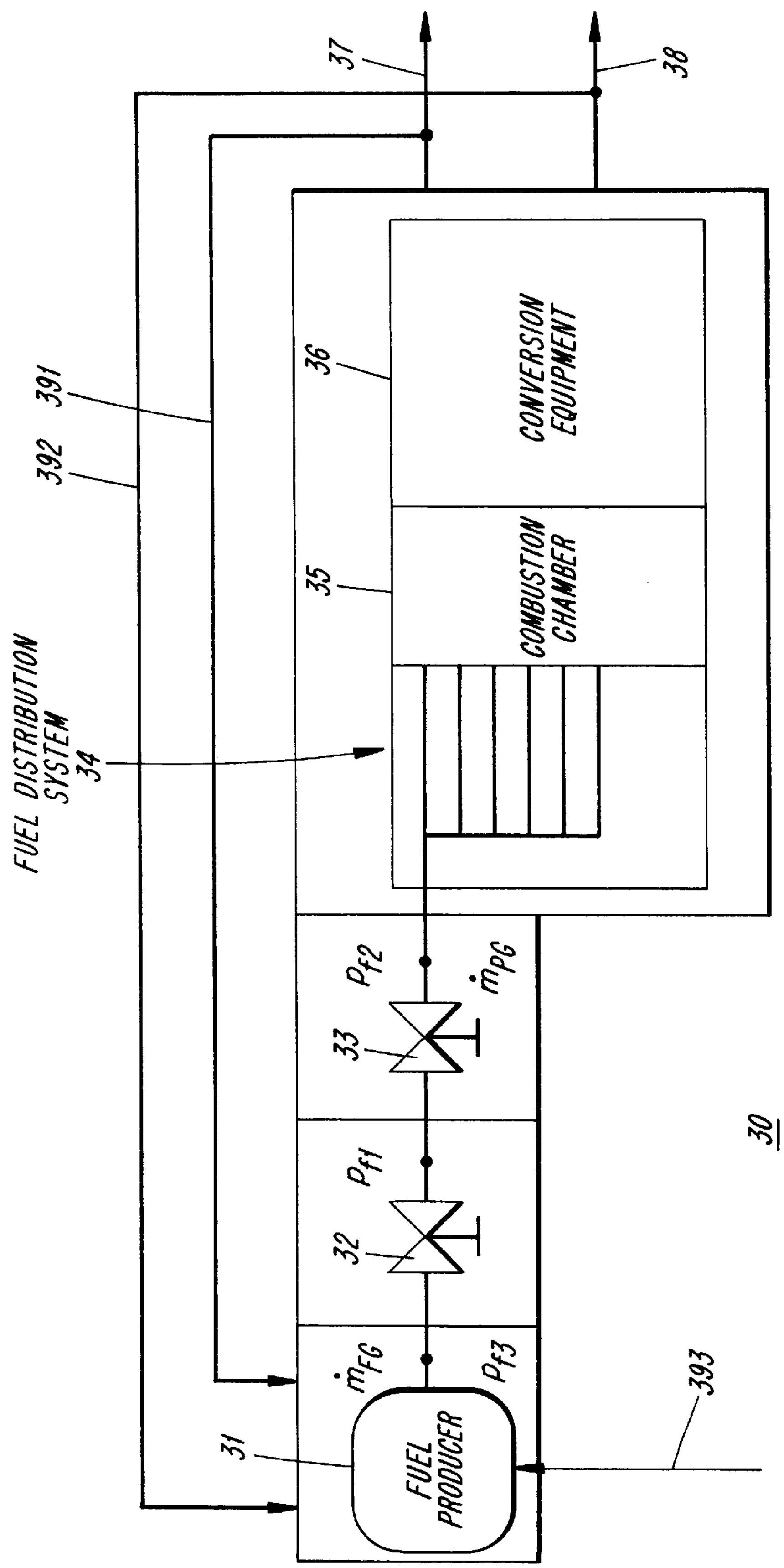
FIG. 3 shows the schematic structure of an IFPG plant without any control or regulation.

The control structure illustrated in FIG. 5 is based on a clear separation of the functionalities of the parts of the plant represented by the fuel producer 31 and conversion equipment 36. The function of the fuel producer 31 is to provide a predefined set point $\dot{m}_{fc}$ of the fuel mass flow, but not an output power as in FIG. 4. The function of the power plant block 34, 35 and 36 is to provide a predefined set point $P_c$ of the output power. Expressed in other words, the fuel producer 31 is the source of a fuel mass flow, while the power plant block is the source of thermal and electrical power. The fuel producer 31 is thus determined by a mass flow regulator, which is implemented via the control loop F1. The control loops F2 and F3 are identical to the corresponding control loops in the SAPP plant of FIG. 1. The coupling C between the control loops on the one hand provides (via the forward coupling of the set point $\dot{m}_{fc}$) an instrument to adapt the bandwidth of the control response of the fuel producer 31 to rapid load changes in the power plant block. On the other hand, it provides (by using the pressure $p_{f3}$) a restriction on the set point $P_c$ for the output power, in order to keep the pressure $p_{f3}$ in the range predefined by the limiting curves a and b of FIG. 2 by restricting the load transients of the power plant block to the dynamic capabilities of the fuel producer 31.

The allocation of the input and output variables in the control loops F1, F2 and F3 which is shown constitutes an effective and simple means of adapting the associated controllers, in an optimum manner with respect to stability, to the three plant components represented by the fuel producer 31, reducing device 32 and power plant block 34, 35, 36. At the same time, this constitutes an indispensable precondition for ensuring the stability of the power plant 50 as a whole. It should be pointed out that, as distinct from the conventional solution from FIG. 4, the new solution according to FIG. 5 is insensitive to fluctuations in the calorific value of the fuel, since in this configuration the calorific value occurs only as the loop gain of the control loop of the power plant block. This is not the case in the conventional concept of FIG. 4.

Figure 4:
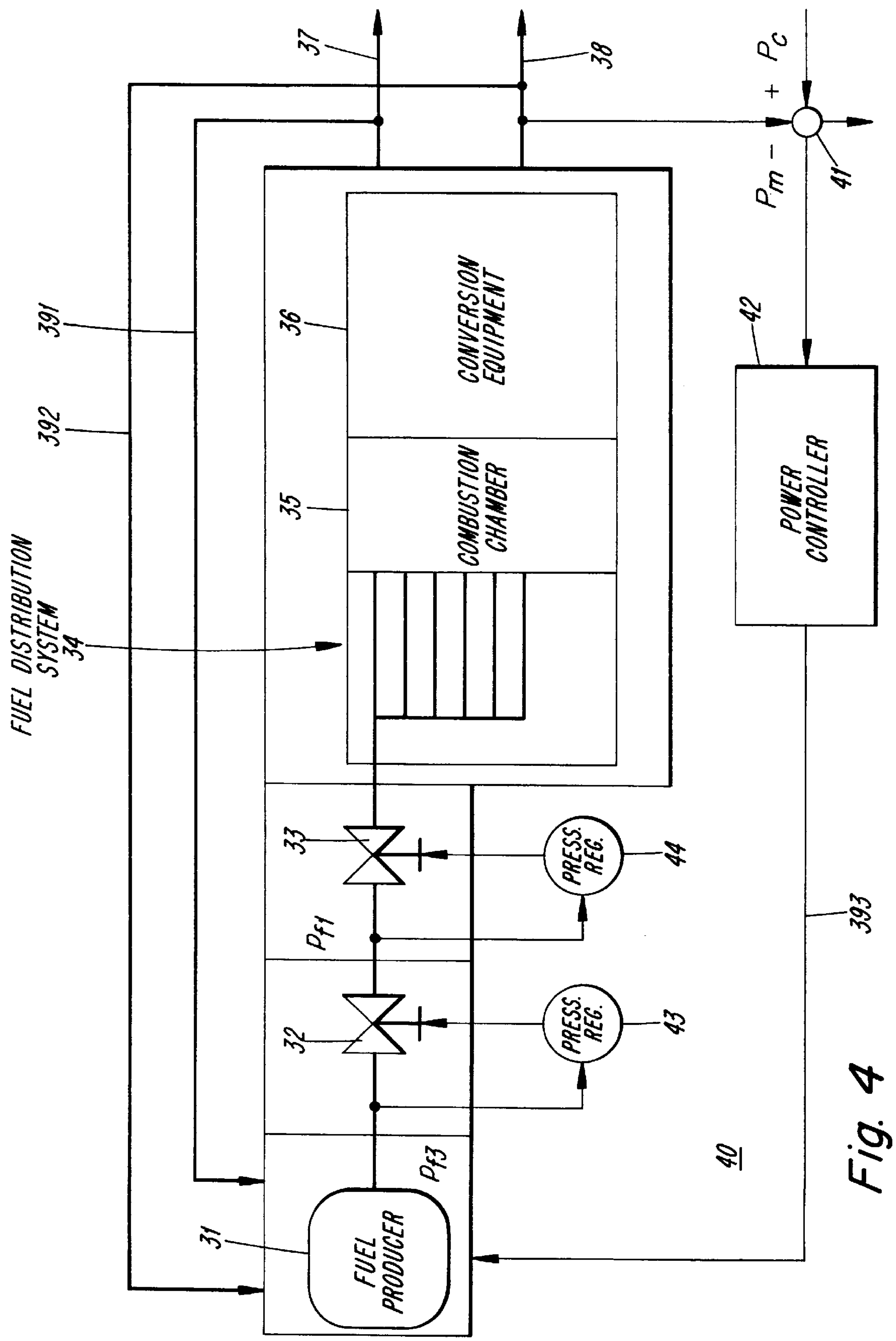
FIG. 4 shows the IFPG plant according to FIG. 3 with control and regulation according to the prior art.

The control loop F3 is used to stabilize the power plant block via the control valve 33. It may therefore be optimized for the dynamics of the power plant block. Since the dynamics of the power plant block are much greater than the dynamics of the fuel producer 31, the dynamic restrictions in the power control system which exist in the conventional solution according to FIG. 4 are eliminated. The control loops F2 and F3 having the pressure regulator 54, the power controller 56 and the fuel/valve position converter 55 correspond to the control philosophy in the SAPP plant according to FIG. 1, and therefore do not require any change in the previous control concept of the power plant block. This is particularly important because a large number of internal controllers in the power plant block depend on the presence of the control loops F2 and F3.

The overall result of the invention is a control and regulation system for an IFPG power plant which avoids the disadvantages of the previous solution (FIG. 4). The necessary outlay on implementing the control concept is low, since the fundamental control structures in the power plant block (control loops F2 and F3) can be taken over in unchanged form from the previous solutions. It is only necessary to redesign the stabilization of the fuel producer 31 via the control loop F1 and the coupling C.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of controlling and regulating a power plant, in which power plant thermal power is generated in a combustion chamber from a gaseous fuel and the thermal power is at least partially converted into electrical power in conversion equipment and in which power plant the fuel for the, combustion chamber is produced in a fuel producer from a feed product with the application of thermal and/or electrical power, which is removed at the outlet from the conversion equipment, and said fuel is passed on to the combustion chamber, wherein the production of the fuel in the fuel producer is stabilized by a first control loop, and the conversion of the fuel into electrical power in the conversion equipment is stabilized by a second control loop and wherein the power plant as a whole is kept within a predefined operating range by coupling the two control loops.

2. The method as claimed in claim 1, wherein in the first control loop the pressure at the outlet from the fuel producer is measured and is kept constant by a first pressure regulator, which controls the supply of the feed product to the fuel producer, and wherein in the second control loop the power at the outlet of the conversion equipment is measured and is kept at a predefined power set point by a power controller, which controls the supply of the fuel to the conversion equipment.

3. The method as claimed in claim 2, wherein in order to control the fuel supply to the conversion equipment, a control valve is used, wherein the power controller outputs a signal which corresponds to the required fuel mass flow, and wherein the output signal from the power controller is converted by means of a fuel/valve position converter into a valve position signal and used to operate the control valve.

4. The method as claimed in claim 3, wherein within the coupling of the two control loops, on the one hand, to adapt load changes to the pressure provided by the fuel producer, a set point change is derived from a pressure, measured downstream of the outlet of the fuel producer and is combined with the externally predefined power set point to form a new power set point for the second control loop, and wherein, on the other hand, the power controller output signal corresponding to the required fuel mass flow is simultaneously used to control the supply of the feed product to the fuel producer.

5. The method as claimed in claim 4, wherein, in order to derive the set point change, use is made of the pressure measured at the outlet of the fuel producer.

6. The method as claimed in claim 4, wherein, in order to derive the set point change, use is made of the pressure measured downstream of the control valve.

7. The method as claimed in claim 3, wherein the pressure that is present at the outlet from the fuel producer is reduced to a lower pressure by a reducing device arranged between the fuel producer and the control valve, wherein the reduced pressure at the outlet from the reducing device is measured and is kept within a predefined operating range by a second pressure regulator, which acts on the reducing device, and wherein the measured reduced pressure is simultaneously used to derive the valve position signal.

8. The method as claimed in claim 3, wherein the pressure at the outlet of the control valve is measured and simultaneously used to derive the valve position signal.

9. The method as claimed in claim 1, wherein the conversion equipment comprises at least one gas turbine and/or at least one steam turbine, and wherein, in order to produce the fuel, steam and/or electrical power and/or compressor air from the gas turbine is fed back from the outlet of the conversion equipment to the fuel producer.

10. A power plant for implementing the method as claimed in claim 1, comprising a combustion chamber, whose inlet is connected via a control valve to a fuel producer having a controllable supply for a feed product used for fuel production, and whose outlet is connected to conversion equipment for the at least partial conversion of the thermal power into electrical power, wherein the fuel producer, together with a first pressure regulator, whose input is connected to the outlet of the fuel producer and whose output is connected to the supply for the feed product, forms a first control loop, wherein the conversion equipment, together with a power controller, whose input is connected via a subtracter for a power set point to the output of the conversion equipment and whose output is connected to the control valve, forms a second control loop, and wherein there are means, which couple the two control loops to each other.

11. The power plant as claimed in claim 10, wherein the coupling means comprise an adaptation circuit, whose input is connected to the output of the fuel producer or to the outlet of the control valve, and whose output is connected to an adder for the power set point, and which allocates a set point change for the externally predefined power set point to each pressure value and from the outlet of the fuel producer and the control valve, respectively, and wherein the coupling means further comprise a fuel/feed product converter, whose input is connected to the output of the power controller and whose output is connected via an adder to the supply for the feed product.

12. The power plant as claimed in claim 11, wherein a reducing device is arranged between the fuel producer and the control valve in order to reduce the pressure, wherein the reducing device, together with a second pressure regulator), whose input is connected to the output of the reducing device and whose output controls the reducing device, forms a control loop, and wherein means are provided which control the valve position of the control valve as a function of the pressure value at the outlet of the reducing device.

13. The power plant as claimed in claim 11, wherein a gas compressor is arranged between the fuel producer and the control valve in order to increase the pressure, wherein the gas compressor, together with a second pressure regulator, whose input is connected to the outlet of the gas compressor and whose output controls the gas compressor, forms a control loop, and wherein means are provided which control the valve position of the control valve as a function of the pressure value at the outlet of the gas compressor.

14. The power plant as claimed in claim 12, wherein the means for controlling the control valve comprise a fuel/valve position converter, whose output acts on the control valve and which has three inputs, wherein the pressure value from the outlet of the reducing device or of the gas compressor is applied to one input, wherein the second input is connected to the output of the power controller, and wherein the pressure value from the outlet of the control valve is applied to the third input.

* * * * *